(12) United States Patent
Villanger et al.

(10) Patent No.: US 10,189,457 B2
(45) Date of Patent: Jan. 29, 2019

(54) DRAIN VALVE

(71) Applicant: Kongsberg Automotive AS, Kongsberg (NO)

(72) Inventors: Kjell Villanger, Raufoss (NO); Sture Sörli, Övre Snertingdal (NO); Henning Rud, Lillehammer (NO)

(73) Assignee: Kongsberg Automotive AS, Kongsberg (NO)

( * ) Notice: Subject to any disclaimer, the term of this patent is extended or adjusted under 35 U.S.C. 154(b) by 172 days.

(21) Appl. No.: 15/509,270

(22) PCT Filed: Sep. 10, 2014

(86) PCT No.: PCT/EP2014/069277
§ 371 (c)(1),
(2) Date: Mar. 7, 2017

(87) PCT Pub. No.: WO2016/037647
PCT Pub. Date: Mar. 17, 2016

(65) Prior Publication Data
US 2017/0282884 A1     Oct. 5, 2017

(51) Int. Cl.
| | | |
|---|---|---|
| *B60T 17/00* | (2006.01) |
| *B60T 15/36* | (2006.01) |
| *F16K 1/36* | (2006.01) |
| *F16K 31/60* | (2006.01) |
| *F16K 27/02* | (2006.01) |
| *F16K 15/02* | (2006.01) |
| *B29L 31/00* | (2006.01) |
| *B29C 45/16* | (2006.01) |
| *B29K 77/00* | (2006.01) |
| *B29K 309/08* | (2006.01) |

(52) U.S. Cl.
CPC ............ *B60T 17/004* (2013.01); *B60T 15/36* (2013.01); *F16K 1/36* (2013.01); *F16K 27/02* (2013.01);
(Continued)

(58) Field of Classification Search
CPC ... F16K 1/36; F16K 27/02; F16K 1/46; F16K 15/021; F16K 15/025; F16K 15/026;
(Continued)

(56) References Cited

U.S. PATENT DOCUMENTS

| | | | | |
|---|---|---|---|---|
| 2,095,696 A | * | 10/1937 | Hackel | ................... B60R 17/02 184/1.5 |
| 3,805,820 A | | 4/1974 | Brady, Jr. et al. | |

(Continued)

FOREIGN PATENT DOCUMENTS

| | | |
|---|---|---|
| EP | 0341880 B1 | 11/1989 |
| KR | 20000036902 A | 5/2000 |

OTHER PUBLICATIONS

International Search Report and Written Opinion for PCT/EP2014/069277 dated Dec. 5, 2015; 10 pages.

(Continued)

*Primary Examiner* — Kevin Murphy
*Assistant Examiner* — Kelsey Cary
(74) *Attorney, Agent, or Firm* — Howard & Howard Attorneys PLLC

(57) ABSTRACT

A drain valve for a compressed air brake system of a vehicle comprises a valve housing defining a valve chamber open at one end and a drain aperture at the opposite end. A poppet has a poppet body at least partially received in the valve chamber and provided with a seal. The poppet is slidable between a closed position in which the poppet and the seal contact the inner wall of the valve housing around the drain aperture thereby closing the drain aperture, and an open (Continued)

position moved away from the drain aperture. A spring urges the poppet to the closed position. The poppet and the seal are incorporated in a single multi-component injection molded plastic part comprising at least two components. The poppet body is formed of a first plastic component and the seal is formed of a second plastic component partially embedded in the first plastic component.

25 Claims, 4 Drawing Sheets

(52) U.S. Cl.
CPC ...... *B29C 45/1676* (2013.01); *B29K 2077/00* (2013.01); *B29K 2309/08* (2013.01); *B29K 2995/007* (2013.01); *B29L 2031/7506* (2013.01); *F16K 15/026* (2013.01); *F16K 31/60* (2013.01)

(58) Field of Classification Search
CPC ........ F16K 15/18; F16K 31/60; B60T 17/004; B60T 15/36
USPC .... 137/315.27; 251/334, 321, 291, 293, 319
See application file for complete search history.

(56) References Cited

U.S. PATENT DOCUMENTS

| | | | | |
|---|---|---|---|---|
| 4,877,050 | A * | 10/1989 | Harris | F16K 31/602 |
| | | | | 137/315.37 |
| 5,090,446 | A * | 2/1992 | Hunter | A01G 25/16 |
| | | | | 137/540 |
| 5,164,136 | A | 11/1992 | Comert et al. | |
| 5,193,579 | A * | 3/1993 | Bauer | B01D 35/147 |
| | | | | 137/540 |
| 5,226,632 | A * | 7/1993 | Tepman | F16K 1/10 |
| | | | | 137/315.27 |
| 7,677,531 | B1* | 3/2010 | Hollars | F16K 1/16 |
| | | | | 119/75 |
| 2003/0197145 | A1* | 10/2003 | Fortino | F16K 27/07 |
| | | | | 251/291 |
| 2006/0012080 | A1 | 1/2006 | Eno et al. | |
| 2009/0145487 | A1* | 6/2009 | Holden | F16K 15/025 |
| | | | | 137/315.04 |

OTHER PUBLICATIONS

English language abstract for KR20000036902 extracted from espacenet.com database dated Jan. 30, 2017; 1 page.

* cited by examiner

DRAIN VALVE

This application is the U.S. National Stage of International Patent Application No. PCT/EP2014/069277, filed Sep. 10, 2014, the content of which is incorporated herein by reference.

The present invention relates to a drain valve for a compressed air brake system of a vehicle, comprising a valve housing defining a valve chamber open at one end and having a drain aperture at the opposite end of the valve housing, a poppet having a poppet body at least partially received in the valve chamber and being provided with a seal, wherein the poppet is slidable between a closed position in which it contacts with its seal the inner wall of the valve housing around the drain aperture thereby closing the drain aperture, and an open position moved away from the drain aperture, and a spring acting between the valve housing and the poppet urging the poppet to the closed position.

Drain valves are used in compressed air brake systems for vehicles. Such a drain valve is usually mounted in the wall of the air brake system at a position which is in the normal orientation of the vehicle vertically at the lowest level. The drain valve can be opened by exerting force on a poppet stem which extends through the drain aperture to the outside. By exerting a force pushing the stem inwards a disc of the poppet is lifted off the valve seat around the drain aperture, thereby opening the drain valve. The drain valve is opened for the purpose to drain condensed water, residual oil or any other liquids that have accumulated in the air brake system.

Conventional drain valves of this kind have been used in the automotive industry since many years. The main components of such conventional drain valves are made of brass. That is, the valve housing is turned out of a brass block to include an outer surface adapted such that the valve may be mounted in an opening of the wall of an air brake system. The valve housing is further provided with an essentially cylindrical valve chamber in the interior. The valve chamber is open on one side of the valve housing which is intended to be open to the interior of the air brake system. At the opposite end the valve housing is provided with a drain aperture. A poppet is likewise turned out of a brass block, wherein the poppet is forged to include a poppet disc at one end and a poppet stem extending therefrom. Then a sealing ring is fixed either on the poppet disc surrounding the stem or in the valve housing in the valve seat surrounding the aperture opening. After insertion of the poppet into the valve housing such that the poppet disc is disposed within the valve chamber and the poppet stem extends therefrom through the drain aperture, a bias spring is mounted such that it rests with one end within the valve housing and with its other end on the poppet disc such that the poppet is urged to the closed position.

One of the disadvantages of the conventional drain valves is that the turning process for forming the poppet is rather time consuming and expensive. Furthermore, a significant amount of the brass material is wasted during the turning process. In addition a seal has to be provided as a separate component which then in some manner has to be fixed on the poppet, for example by crimping parts of the poppet body or by providing other extra fixing means. Further to these additional assembly steps to attach the seal, the connection of the seal on the poppet is not very strong so that there is a risk that the seal becomes disengaged and breaks away from the poppet.

It is an object of the present invention to provide a drain valve which may be manufactured and assembled in a simpler and more cost effective manner.

This object is achieved by a drain valve comprising the features of claim 1. Preferred embodiments of the invention are set out in the dependent claims.

According to the present invention the poppet and the seal are incorporated in a single multi-component injection molded plastic part comprising at least two components, wherein the poppet body is formed of a first plastic component and the seal is formed of a second plastic component partially embedded in the first plastic component.

Injection molding processes, also multi-component injection molding processes, are much simpler, less time consuming and more cost effective than turning processes, at least if the number of parts to be manufactured is above a certain level.

Besides the advantages of a simpler manufacturing process, as well as a simpler assembly process with fewer parts since the seal is already integrated into the poppet, and the avoided need of waste handling of turned off brass material, there is a further an advantage of the drain valve according to the invention because it is more resistant and robust in use. Drain valves are commonly located on the underbody of vehicles and are exposed to particles like little stones which may hit the drain valves when being swirled up by the driving vehicle. Brass is a rather brittle material, and therefore impacts of objects swirled up by driving vehicles frequently caused damage to the poppets of drain valves. According to the present invention a multi-component injection molded plastic part can be made with much better resistance, in particular when selecting for the first plastic component a plastic with a suitable hardness and filled with reinforcing fibre additives, such as glass fibres or carbon fibres.

Providing the poppet and the seal as a plastic material composite allows to select the plastic materials and the reinforcing fillers in a manner such that a significantly higher impact strength can be achieved compared to conventional brass poppets. This in turn opens new fields of applications, i.e. the drain valves of the present invention may be placed in areas of the underbody of vehicles which so far were excluded due to damage risks because of frequent impacts. In other words the drain valves according to the present invention give the designers of vehicles more freedom to design the air brake systems and to place the drain valves. In addition, completely new fields of applications are made available to utilize the drain valves according to the present invention, for example under tractors or other utility vehicles which are frequently employed in harsh environmental conditions including frequent impacts of objects.

Another advantage of a drain valve according to the present invention is the weight reduction which results from making the poppet as a composite plastic member instead of brass. Weight reduction is generally a design goal in the vehicle industry.

A multi-injection molding method suitable for producing the poppets for the drain valves according to the present invention is described in EP 0 341 880 B1.

Preferably, in the contact area between first and second plastic component there are undercut or interlocking structures such that the first and second components are interlaced to form a firm engagement between first and second components of the poppet so that the seal cannot break away from the poppet.

In a preferred embodiment the poppet body comprises a disc disposed in the valve chamber and a stem, wherein the first plastic component in the disc of the poppet is formed with a annular groove coaxial with the stem, wherein the groove is filled with the second plastic component such that the second plastic component projects beyond the surface of the disc to form an annular sealing.

In a preferred embodiment circumferentially distributed channels extend through the disc of the poppet body which channels connect the groove to the opposite surface of the disc and which are filled with the first plastic component.

In a preferred embodiment the first plastic component of the poppet has a shore D hardness in the range of 65 to 85.

In a preferred embodiment the second plastic component of the poppet has a shore A hardness in the range 50 to 70.

In a preferred embodiment the second plastic component comprises a thermoplastic elastomer.

In a preferred embodiment the first plastic component comprises a polyamide. In particular, it is preferred that the first plastic component comprises a fibre reinforced polyamide. Preferably, the first plastic component completely consists of such fibre reinforced polyamide. It is particularly preferred to use polyamide 12 as the polyamide of the above-mentioned first plastic components.

According to a preferred embodiment the first plastic component comprises fibre reinforced polyamide with a fibre content in the range 30-50 vol. %. Such material selection allows to provide a poppet with improved impact strength. Typically, a fibre content of 30-50 vol. % can increase the impact strength of the component two to three times, depending on the design of the component, compared to polyamide materials without reinforcing fibres.

In a preferred embodiment the stem of the poppet comprises in its end region remote from the disc a through hole for receiving a portion of the circumference of a ring, wherein a slot of smaller widths than the diameter of the hole connects the hole to an exterior surface of the stem such that a ring can be pressed into the slot and can, under elastic deformation of the stem around the slot, be pushed through the slot and into the hole such that the stem regions around the hole and slot snap into place once the ring reached the hole to retain the ring in the hole. Such a ring is used to allow manual opening of the drain valve, for example by introducing a finger into the ring and pulling the poppet outwards. In the prior art using brass poppets a through hole for receiving portions of the ring was provided, which hole had no connection to the outer surface of the stem. The ring had to be a key-ring which was manually opened before introducing it into the hole of the poppet. According to this preferred embodiment a simple continuous ring can be applied which is snapped into place after pushing it through the slot to the through hole which is made possible by the elastic properties of the first plastic component.

In an alternative embodiment a ring extending from an end region of the poppet remote from the disc is integrally formed with the poppet by injection molding. In particular it is preferred that the ring is formed of an elastic plastic component to be foldable, or that the ring is formed with hinge zones in the form of solid hinges, to allow folding of the ring when the poppet is advanced with its stem through the drain aperture during assembly of the drain valve.

The invention will be described in the following in connection with the preferred embodiment referring to the drawings in which.

Figure 1:
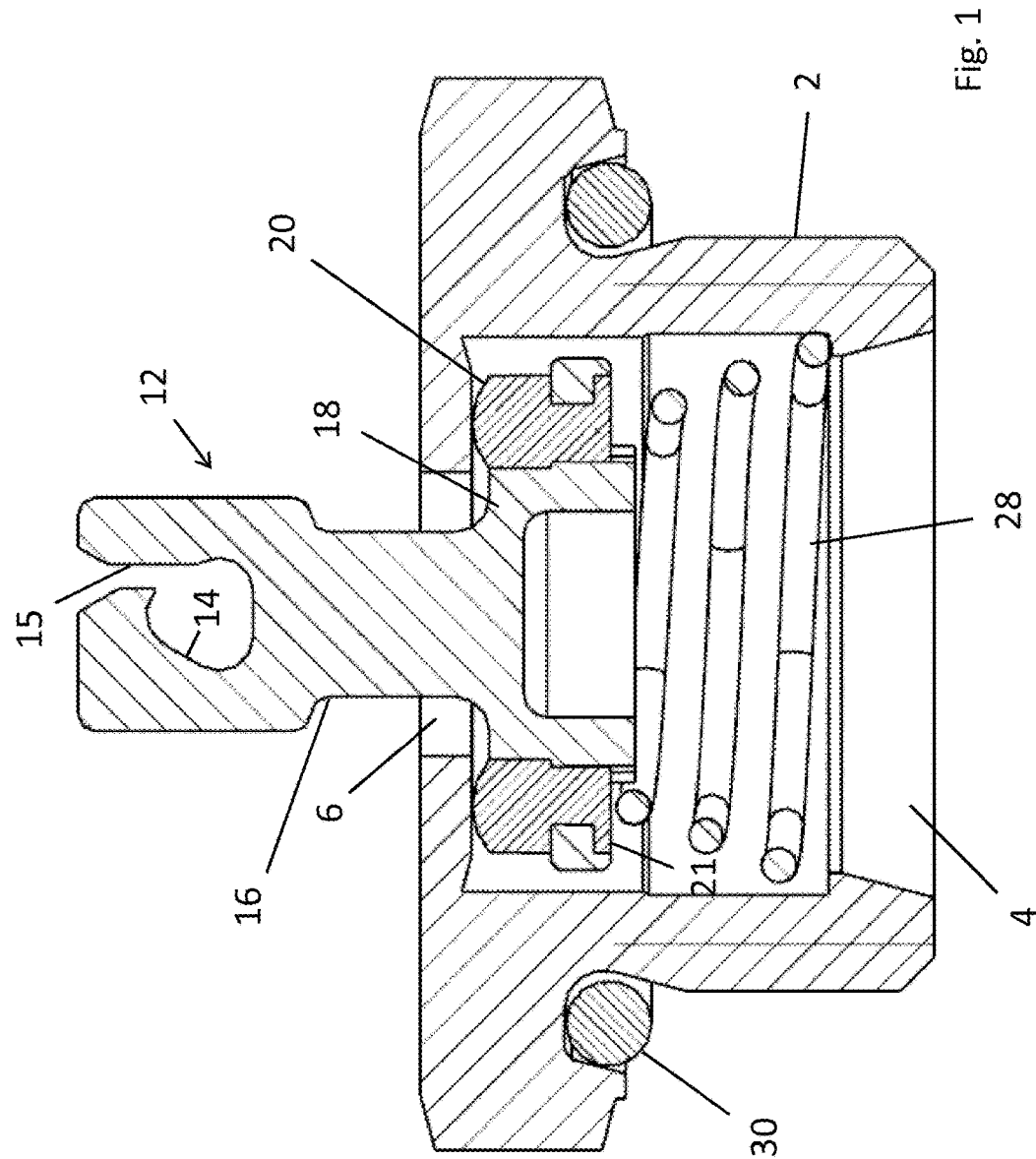
FIG. 1 shows a cross-sectional view of a drain valve according to the present invention.

The drain valve shown in FIG. 1 in cross-sectional view comprises a valve housing 2 having a valve chamber having an open end 4 at one of its ends and a drain aperture 6 at its opposite end. A poppet 12 is partially received in the valve chamber in such a manner that a disc 18 of the poppet is disposed within the valve chamber and that a poppet stem 16 extends therefrom through the drain aperture 6 to the outside. The poppet is further provided with a sealing ring 20.

A spring 28 is resting on a shoulder near the lower end of the valve chamber and abuts with its opposite end against the disc 18 of the poppet to urge the poppet to the closed position in which the sealing ring 20 is pressed against the inner wall of the valve housing 2 around the drain aperture 6 to close the valve.

The valve housing 2 is adapted to be mounted in the wall of a compressed air brake system. For this purpose the housing 2 is also provided with a circumferential groove in which a sealing ring 30 is disposed such that the valve housing 2 may be mounted in the wall of the air brake system in a sealed manner.

Figure 2:
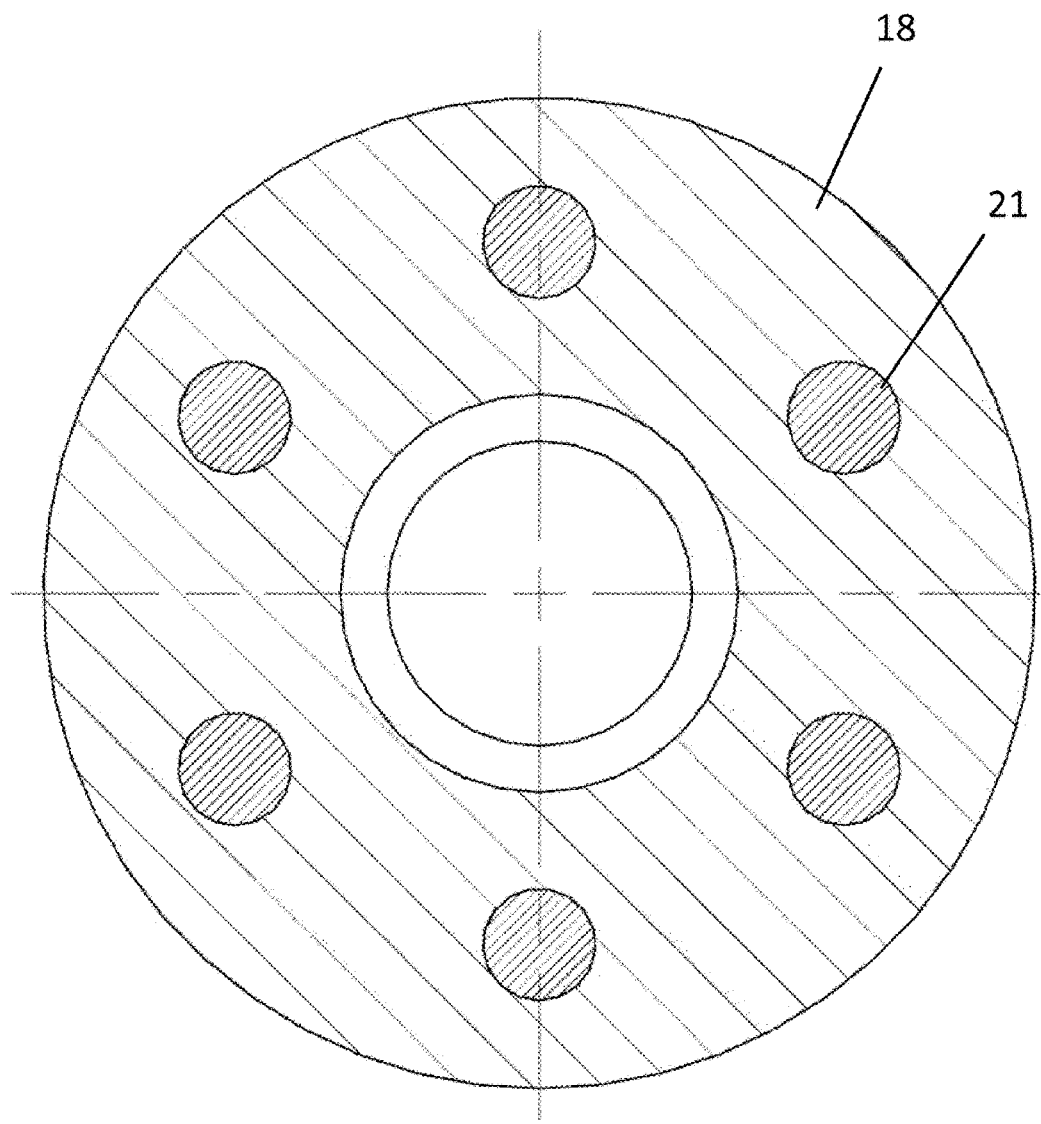
FIG. 2 shows a bottom view of a poppet of a drain valve according to the present invention.
Figure 3:
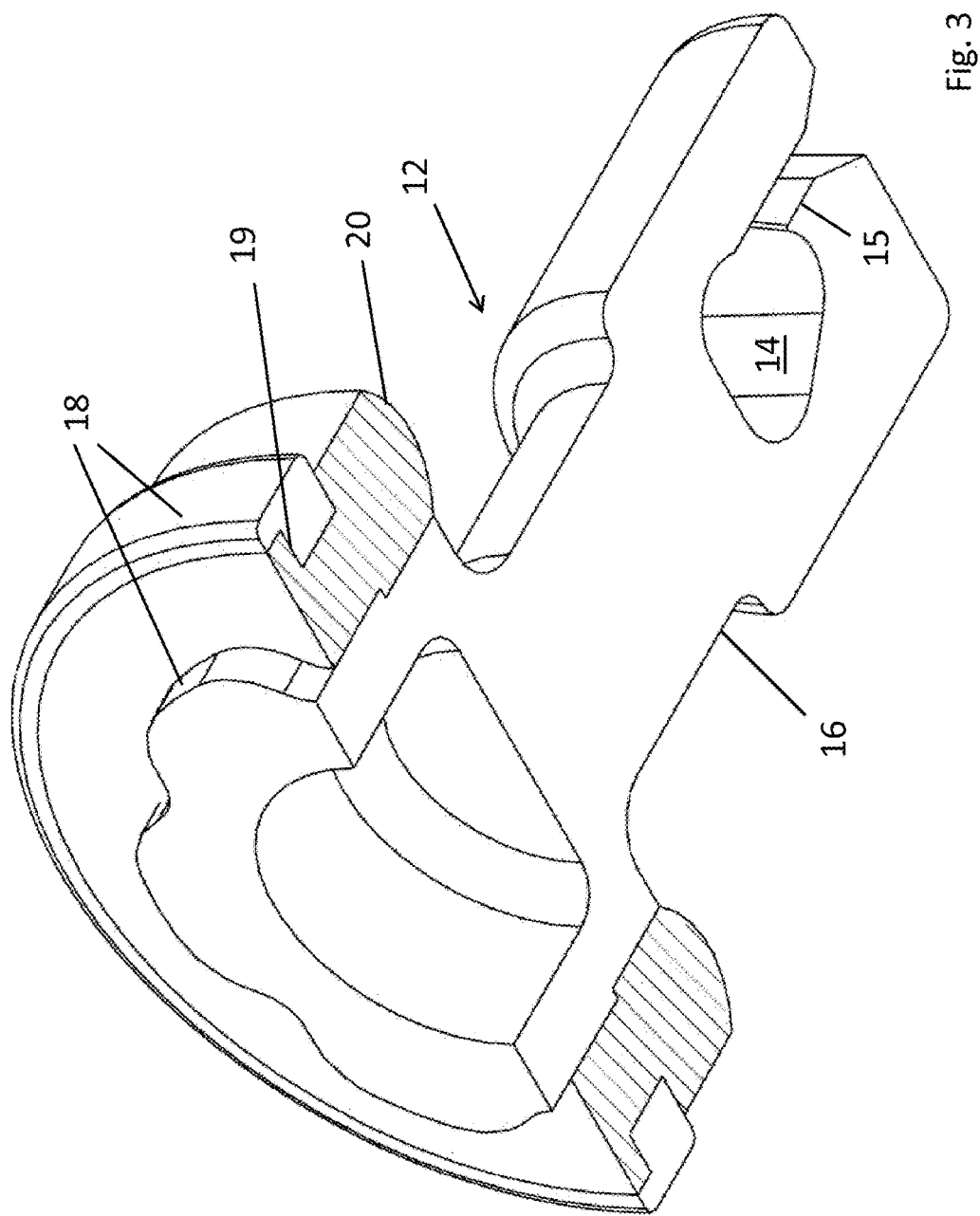
FIG. 3 shows a perspective view of a poppet for a drain valve according to the present invention cut in the middle.
Figure 4:
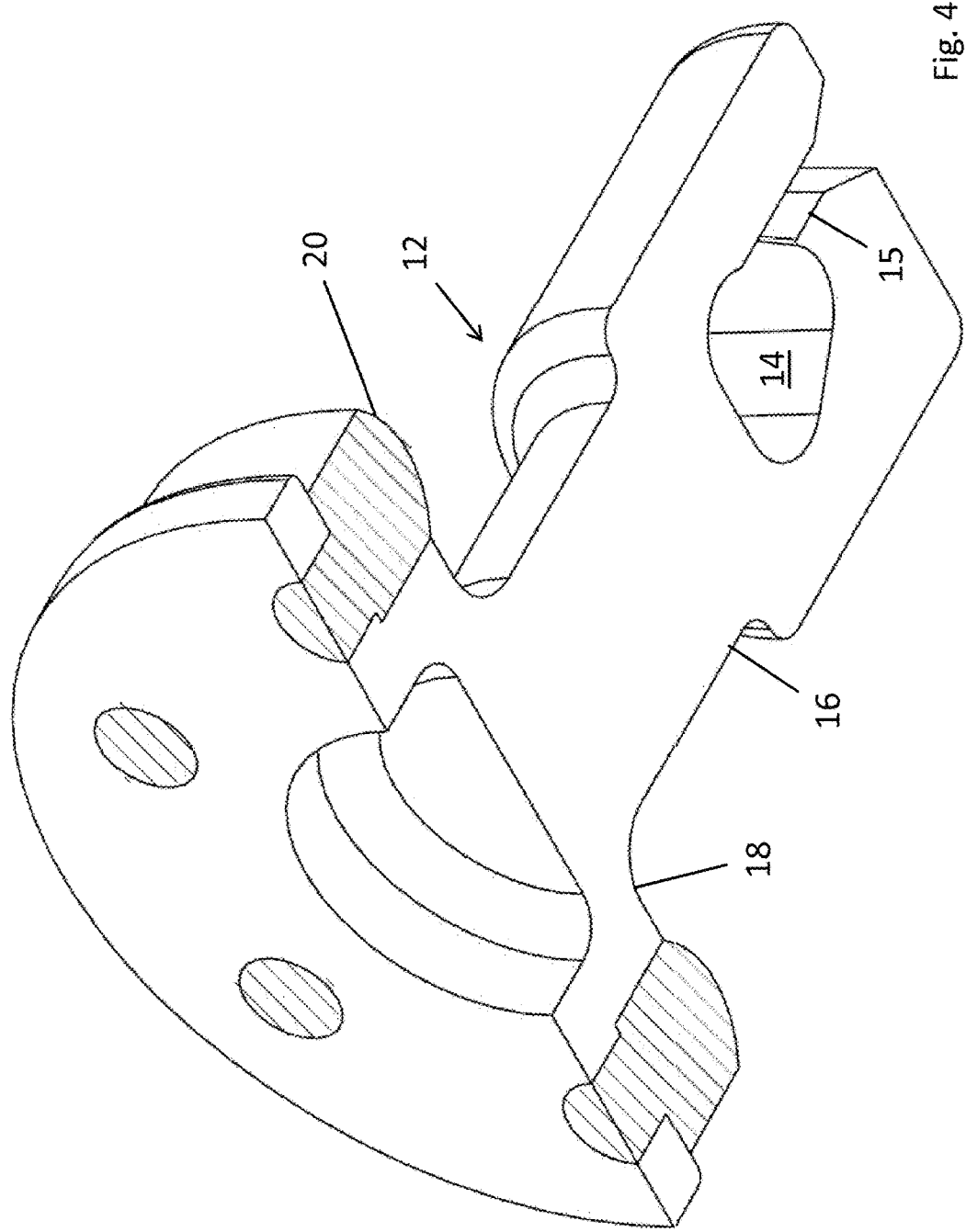
FIG. 4 shows a further cut view as in FIG. 3, wherein it is further cut in a plane perpendicular to the longitudinal axis of the poppet stem.

As can be seen in FIGS. 2 to 4 the poppet is formed as a two-component injection molded part, wherein the poppet body is formed of a first plastic component which forms the poppet stem 16 at the poppet disc 18. The poppet disc is injection molded with a circumferential groove extending concentrically around the longitudinal axis of the poppet stem. This groove is filled up in a second injection molding step with a second plastic component in such a manner that the second plastic component extends beyond the surface of the groove on the side of the poppet stem 16 to form an annular sealing ring. The groove in the poppet disc 18 is further provided with holes or channels which are going through the disc through which the second plastic component is injected in the second injection step and which are likewise filled with the second plastic component. The lower surface of the second plastic component in the holes is designated by reference numeral 21.

As can be seen for example in FIG. 3 the groove in the poppet disc is further provided with an undercut or interlocking structure 19 such that the first and second plastic component of the poppet are interlaced or interlocked such that the annular sealing ring 20 is firmly connected to the poppet body.

As can be seen in FIGS. 1, 3 and 4 the end portion of the stem remote from the disc 18 includes a though hole 14. This through hole 14 is connected by an adjoining slot 15 to the outer surface and to the exterior of the stem 12. The width of this slot 15 is smaller than the diameter of the hole 14. The purpose of this arrangement is to allow a snap-in connection of a ring. The ring is dimensioned such that a portion of the circumference of the ring fits into the through hole 14, wherein the thickness of the ring is larger than the width of the slot, but slightly smaller or equal to the diameter of the trough hole 14. In order to attach the ring to the poppet a portion of the ring is introduced in the widened upper opening of the slot 15 and pushed into the slot 15. The portions of the stem surrounding the slot are elastically deformed when the ring is pushed through the slot 15, whereafter these portions snap back into place once the ring has reached the hole 14. Such a way of attaching a ring to the poppet is much simpler than in conventional drain valves. Conventionally the poppet of such drain valve had a through hole with no connection to the outer surface of the stem. A split ring or key-ring had to be used which was first spread open, whereafter the open ends were introduced into the through hole from its opposite ends. The present invention allows to use a simple continuous ring which can be attached to the poppet by a snap-in action.

In an alternative embodiment the ring at the end of the poppet remote from the disc may be integrally formed with the stem of the poppet by injection molding. Since the ring is dimensioned such that it allows to insert a finger of the operator, it has a larger outer diameter than the diameter of the drain aperture 6 for typical drain valve dimensions. For this reason it is necessary that the ring can be folded or elastically deformed so that it can pass the drain aperture 6 when the stem 16 of the poppet 12 is advanced through the drain aperture 6 during assembly of the drain valve. This ability to deform the ring during assembly can be achieved for example by forming the ring in the injection molding procedure of a sufficiently elastic plastic component. Alternatively, the ring can be provided with hinge zones in form of solid hinges which allow folding of certain portions of the ring such that it may pass the drain aperture 6 during assembly.

For the first plastic component preferably a 30 vol. % glass fibre reinforced, heat stabilized polyamide 12 with injection molding grade is used. Such a material has the following mechanical properties:

|  | | Standard | Unit | State | |
| --- | --- | --- | --- | --- | --- |
| Tensile E-Modulus | 1 mm/min | ISO 527 | MPa | cond. | 6000 |
| Tensile strength at break | 5 mm/min | ISO 527 | MPa | cond. | 105 |
| Elongation at break | 5 mm/min | ISO 527 | % | cond. | 8 |
| Impact strength | Charpy, 23° C. | ISO 179/1eU | kJ/m$^2$ | cond. | 80 |
| Impact strength | Charpy, −30° C. | ISO 179/1eU | kJ/m$^2$ | cond. | 80 |
| Notched impact strength | Charpy, 23° C. | ISO 179/1eA | kJ/m$^2$ | cond. | 20 |
| Notched impact strength | Charpy, −30° C. | ISO 179/1eA | kJ/m$^2$ | cond. | 15 |
| Shore hardness D | | ISO 6 8 | — | cond. | 77 |

The abbreviation cond. stands for "conditioned".

Various modifications of the preferred embodiment shown in the drawings can be made without deviating from the teaching of the present invention as defined in the following claims. For example, the poppet and the valve chamber do not have to be circular but could also have other shapes as long as the end piece of the poppet or disc disposed in the valve chamber fits to the design of the inner walls of the valve chamber such that the poppet can slide within the valve chamber to be lifted off the valve seat to open the drain valve. In addition, the poppet and the seal can be made as a composite plastic component comprising more than two plastic components.

The invention claimed is:

1. A drain valve for a compressed air brake system of a vehicle, the drain valve comprising:
 a valve housing (2) defining a valve chamber open at one end and having a drain aperture (6) at the opposite end of the valve housing,
 a poppet (12) having a poppet body at least partially received in the valve chamber and being provided with a seal (20), the poppet being slidable between a closed position in which the seal contacts the inner wall of the valve housing around the drain aperture (6) thereby closing the drain aperture, and an open position moved away from the drain aperture, and
 a spring (28) acting between the valve housing and the poppet urging the poppet to the closed position,
 the poppet (12) and the seal (20) being incorporated in a single multi-component injection molded plastic part comprising at least two components,
 the poppet body being formed of a first plastic component and the seal formed of a second plastic component partially embedded in the first plastic component, in that the poppet (12) comprises a disc (18) disposed in the valve chamber and a stem (16) extending from the disc and through the drain aperture (6),
 the first plastic component of the single multi-component injection molded plastic part forming the disc (18) and the stem (16),
 the disc comprising an annular groove coaxial with the stem and extending partly through the disc, the second plastic component filling the annular groove and projects beyond the disc surface to form an annular sealing ring embedded in the first plastic component of the disc of the poppet body, and in that the stem comprises an end region remote from the disc with the end region defining a through hole (14) for receiving a ring, wherein a slot (15) of smaller width than the diameter of the through hole connects the hole to the exterior surface of the stem such that a ring can be pressed into the slot and can, under elastic deformation of the stem around the slot, be pushed through the slot and into the hole such that the stem snaps into place once the ring reached the hole.

2. The drain valve according to claim 1, wherein the first and second plastic components of the single multi-component injection molded plastic part include interlaced structures (19) of the first and second components to provide for a secure interconnection and a high stability of the composite multi-component injection molded plastic part.

3. The drain valve according to claim 2, wherein the first plastic component has a Shore hardness D in the range between 65 and 85.

4. The drain valve according to claim 2, wherein the second plastic component has a Shore hardness A in the range between 50 and 70.

5. The drain valve according to claim 2, wherein the second plastic component comprises a thermoplastic elastomer.

6. The drain valve according to claim 2, wherein the first plastic component comprises a polyamide.

7. The drain valve according to claim 2, wherein the first plastic component comprises a fibre reinforced polyamide.

8. The drain valve according to claim 1, wherein channels extend through the disc of the poppet body which connect the annular groove to the opposite surface of the disc, and the channels being filled with the second plastic component.

9. The drain valve according to claim 8, wherein the first plastic component has a Shore hardness D in the range between 65 and 85.

10. The drain valve according to claim 8, wherein the second plastic component has a Shore hardness A in the range between 50 and 70.

11. The drain valve according to claim 8, wherein the second plastic component comprises a thermoplastic elastomer.

12. The drain valve according to claim 8, wherein the first plastic component comprises a polyamide.

13. The drain valve according to claim 8, wherein the first plastic component comprises a fibre reinforced polyamide.

14. The drain valve according to claim 1, wherein the first plastic component has a Shore hardness D in the range between 65 and 85.

15. The drain valve according to claim 14, wherein the second plastic component has a Shore hardness A in the range between 50 and 70.

16. The drain valve according to claim 14, wherein the second plastic component comprises a thermoplastic elastomer.

17. The drain valve according to claim 1, wherein the second plastic component has a Shore hardness A in the range between 50 and 70.

18. The drain valve according to claim 1, wherein the second plastic component comprises a thermoplastic elastomer.

19. The drain valve according to claim 1, wherein the first plastic component comprises a polyamide.

20. The drain valve according to claim 19, wherein the second plastic component consists of a fibre reinforced polyamide including 30-50 vol. % fibres.

21. The drain valve according to claim 19, wherein the polyamide is a polyamide 12.

22. The drain valve according to claim 21, wherein the second plastic component consists of a fibre reinforced polyamide including 30-50 vol. % fibres.

23. The drain valve according to claim 1, wherein the first plastic component comprises a fibre reinforced polyamide.

24. The drain valve according to claim 23 wherein the polyamide is a polyamide 12.

25. The drain valve according to claim 23, wherein the second plastic component consists of a fibre reinforced polyamide including 30-50 vol. % fibres.

* * * * *